United States Patent [19]

Schontzler et al.

[11] 4,095,466
[45] Jun. 20, 1978

[54] QUICK INSERT FLUME FOR USE IN METERING FLUID FLOW

[75] Inventors: James G. Schontzler; Wendall C. Gates, both of Santa Cruz, Calif.

[73] Assignee: Manning Environmental Corporation, Santa Cruz, Calif.

[21] Appl. No.: 728,850

[22] Filed: Oct. 1, 1976

[51] Int. Cl.² .............................................. G01F 1/52
[52] U.S. Cl. .................................................... 73/215
[58] Field of Search .............................. 73/215, 194 R

[56] References Cited

U.S. PATENT DOCUMENTS

| | | | |
|---|---|---|---|
| 2,283,906 | 5/1942 | Bennett | 73/215 |
| 3,301,050 | 1/1967 | McNulty | 73/215 |
| 3,427,878 | 2/1969 | Gerlitz et al. | 73/215 |
| 3,719,081 | 3/1973 | Lynn et al. | 73/215 |
| 3,781,624 | 12/1973 | Tullis | 73/313 |
| 3,934,472 | 1/1976 | Bradham | 73/215 |

*Primary Examiner*—Anthony V. Ciarlante
*Attorney, Agent, or Firm*—Flehr, Hohbach, Test, Albritton & Herbert

[57] ABSTRACT

Metering apparatus for installation in the bottom of a sewer well or manhole providing access to a sewer flow path and having an inlet and an outlet pipe at the bottom thereof. A hollow cylindrical section is provided for placement of one end in the outlet pipe, leaving the other end extending into the bottom of the sewer well. An inflatable collar is provided which surrounds the one end of the cylindrical section, and which, when inflated, provides a seal between the inside diameter of the outlet pipe and the outside diameter of the cylindrical section. The end of the cylindrical section which extends into the bottom of the sewer well carries an internally mounted metering flume situated so that the entire flow from the inlet pipe to the outlet pipe passes through the metering flume. The end of the cylindrical section which extends into the bottom of the sewer well is supported by means such as wedging blocks and is held in place against the wedging blocks by means such as a weight placed on top of the cylindrical section. A level indicator is provided to indicate the orientation of the metering flume relative to a horizontal plane. A contact plate is provided having a predetermined height above the bottom of the metering flume so that when a surface detecting device is utilized to monitor the surface level of the flow ahead of the metering flume, it may be directed to the contact plate to provide for a metering flume invert level measurement without contacting fluid flowing through the metering flume.

3 Claims, 5 Drawing Figures

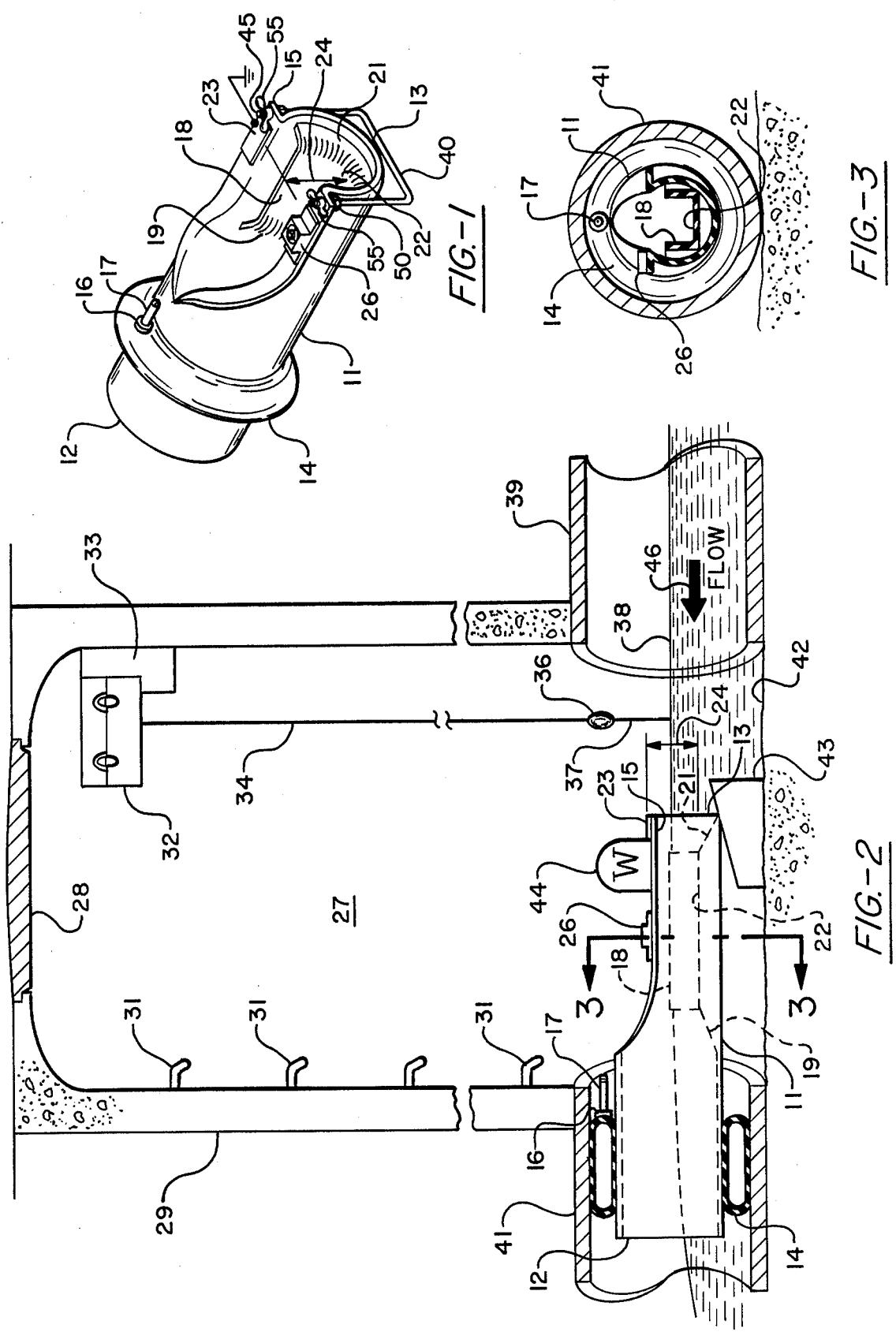

QUICK INSERT FLUME FOR USE IN METERING FLUID FLOW

BACKGROUND OF THE INVENTION

This invention relates to a metering flume for use in fluid flow metering applications and more particularly to such a metering flume for placement in an exit conduit in the bottom of a sewer well.

Accurate measurement of a fluid flow in a flow conduit usually requires installation of a weir or flume together with a device which detects the surface level of the flow ahead of the weir or flume and then converts the surface level to rate of flow. Such an installation requires considerable labor and involves temporarily blocking the flow upstream of the installation, placing the weir or flume in the flow path, sealing it in place and removing the upstream block prior to finally installing the surface detection device. Obtaining an adequate seal of the weir or flume into the invert of the flow path is sometimes complicated. For example, when the installation is to be made in the bottom of a sewer well or manhole, the invert is generally rough and irregular. When a weir is used further complications arise by the large upstream back-up due to the large head drop required at the weir and by silt collection which occurs ahead of the weir. Sealing a flume in the rough and irregular bottom of a manhole is even more difficult. An assembly containing an integral weir or flume is desirable which is easily and quickly sealed in the flow path through the bottom of a sewer well.

SUMMARY AND OBJECTS OF THE INVENTION

In general the apparatus disclosed herein is for installation in the bottom of a sewer well which has an inlet pipe and an exit pipe. A cylindrical exit section is provided in the apparatus for placement in the exit pipe. An inlet section is attached to the cylindrical exit section. The exit section extends into the bottom of the sewer well. Means are mounted in the inlet section for providing a predetermined flow cross section therein. An inflatable collar surrounds the cylindrical exit section so that when the exit section is placed in the exit pipe and the inflatable collar is inflated, a seal is provided therebetween so that the entire flow between the inlet and exit pipe passes through the means for providing a predetermined flow cross section. A fluid surface level is thereby provided ahead of the inlet section for detection by a level measuring device mounted within the sewer well. Flow data is obtained through computation utilizing the known shape of the predetermined flow cross section and the measured surface level ahead of the inlet section relative to the invert level of the flow cross section.

In general it is an object of the present invention to provide a flow metering apparatus for quick installation in a flow path through the bottom of a sewer well.

It is another object of the present invention to provide an accessible flow surface level for use in computation of flow data.

It is another object of the present invention to provide a flow metering apparatus requiring relatively small head loss in creating the accessible fluid surface level.

Additional objects and features of the invention will appear from the following description in which the preferred embodiment has been set forth in detail in conjunction with the accompanying drawings.

BRIEF DESCRIPTION OF THE DRAWINGS

FIG. 1 is an isometric view of one embodiment of the quick insert flume.

FIG. 2 is a sectional side elevation view of the quick insert flume of FIG. 1 installed in the bottom of a manhole.

FIG. 3 is a sectional view along the line 3—3 of FIG. 2.

BRIEF DESCRIPTION OF THE PREFERRED EMBODIMENTS

Figure 5:
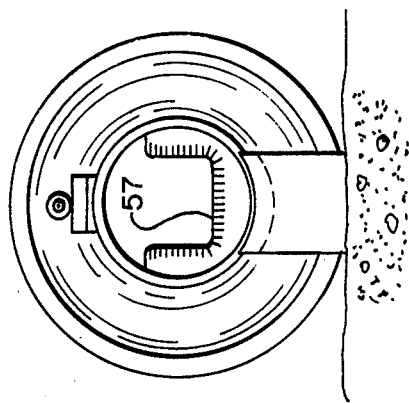
FIG. 5 is a front elevational view along the line 5—5 of FIG. 4.

It is well known in the art that a known flow depth through a known cross section of flow path may be converted to a rate of fluid flow and subsequently totalized to obtain a total flow. Such techniques involve use of the Manning formulas for example, and other theoratical and empirical relationships for providing conversion from head to flow.

FIG. 1 shows one embodiment of the disclosed invention for use in obtaining flow data including a hollow quick insert body 11 having a closed cylindrical exit end 12 and an open inlet section 13 attached thereto. An inflatable collar 14 is provided for surrounding closed cylindrical exit end 12. Inflatable collar 14 has a valve 16 and valve stem 17 through which gas is passed to inflate collar 14. Open inlet section 13 has side flanges 15 formed thereon. A metering flume 18 is mounted internally in the open inlet section 13, being sealed to the inside surface of hollow quick insert body 11 at the ends 19 and 21 thereof. Metering flume 18 has a bottom surface 22. An electrical contact plate 23 is position on one side flange 15 above metering flume 18 which, in this embodiment, is connected to electrical ground potential assigned to an associated electrical circuit for a purpose to be hereinafter described. Electrical contact plate 23 is positioned a predetermined height above bottom surface 22 of metering flume 18 as indicated by dimension 24.

A level indicator 26 is mounted on one of the side flanges 15. The level indicator 26 may be of the "fisheye" type bubble level with cross hairs for indicating the orientation of the base of level 26 relative to a horizontal plane. Level indicator 26 is oriented so that the base thereof provides a reference surface which is in a plane parallel to the plane of bottom surface 22 in metering flume 18.

Turning now to the installation drawing of FIG. 2, the hollow quick insert body 11 is shown installed in the bottom of a sewer well or manhole 27. Manhole 27 may be of the conventional type having a cover 28 placed atop a casing 29, and having ladder rungs 31 for providing access to the bottom of casing 29. A fluid surface level detector 32 is mounted near the top of casing 29 by means of any convenient mounting device 33. The surface level detector 32 may be of the type which transmits and receives reflected electromagnetic or acoustic energy, or may be of the type described in U.S. Letters Pat. No. 3,781,624, granted to Tullis. For illustration purposes FIG. 2 shows the Tullis apparatus as fluid surface level detector 32, including a depending electrically conducting cable 34, a weight 36 attached near the end of depending cable 34 to urge the cable 34 to hang "plumb", and a conducting probe 37 for contacting a fluid flow surface 38 in the bottom of manhold 27. An inlet conduit or pipe 39 enters the bottom of manhole 27 and an exit conduit or pipe 41 is also in communication with the bottom of manhole 27. Manhole 27 has a bottom surface 42 which may have a relatively rough or coarse surface. A wedging block 43 is shown positioned under open inlet section 13 for support thereof. Wedging block 43 is positioned under hollow quick insert body 11 to position bottom surface 22 of metering flume 18 in a substantially horizontal plane. Other means may be provided in place of wedging block 43, such as screw threaded jacks or the like. A weight 44 is provided for holding open inlet section 13 against wedging block 43 once bottom surface 22 is oriented in a substantially horizontal plane.

FIG. 3 shows a cross section of metering flume 18 which provides a predetermined flow cross section for the flow path between inlet conduit 39 and outlet conduit 41. Flume 18 is rectangular in cross section in the example, but may take any desireable shape such as trapezoidal, circular, etc.

One substitution for wedge block 43 is shown in FIG. 1 as a U-shaped rod member 40 which has threaded ends 45. A nut 50 is threaded onto each end 45 and the ends 45 are passed through holes (not shown) in side flanges 15. A wing nut 55 is threaded onto each of the exposed ends 45. Through adjustment of nuts 50 the bottom surface 22 is adjusted in orientation as closed cylindrical exit end 12 is held fixed. The adjustment is held by tightening of each wing nut 55.

Turning back to FIG. 2, the manner in which the quick insert flume assembly is mounted in the bottom of a sewer well or manhole 27 will now be described. Hollow quick insert body 11 with inflatable collar 14 positioned on closed cylindrical exit end 12 is inserted into the open portion of exit conduit 41. A source of air pressure is attached to valve stem 17 for introducing air pressure into the interior of inflatable collar 14 through valve 16. In this manner, inflatable collar 14 is inflated to extend between the outside surface of closed cylindrical exit end 12 and the inside surface of exit conduit 41 for holding closed cylindrical exit end 12 in fixed position and for providing a fluid tight seal between the exit conduit 41 and exit end 12.

Wedging block 43 or some equivalent such as U-shaped rod member 40, is next placed in the bottom 42 of manhole 27 and adjusted underneath upon inlet section 13 until level indicator 26 indicates the base of indicator 26 is in a relatively horizontal plane. Since the base of indicator 26 has been previously aligned to be in a plane parallel to the bottom 22 of metering flume 18, bottom 22 is also in a relatively horizontal plane. The weight 44 is subsequently placed atop open inlet section 13 for the purpose of holding hollow quick insert body 11 in the adjusted position. Fluid surface level detector 32 is positioned in such a manner that probe 37 depends therefrom contacting electrical contact plate 23. The ground potential to which contact plate 23 is connected is also provided in electrical circuitry contained in fluid surface level detector 32. Since the height 24 is known, the invert level or the location of bottom 22 of metering flume 18 is known, and the information is entered into fluid surface level detector 32 as appropriate. All of the foregoing steps relative to installation of the disclosed invention are performed with the normal flow indicated by arrow 46 in FIG. 2 taking place. Fluid surface level detector 32 is then placed in the operate mode and detection of the fluid surface level 38 ahead of metering flume 18 takes place. As shown in FIG. 2, probe 37 detects fluid flow surface level 38 as described in the Tullis patent reference above.

Figure 4:
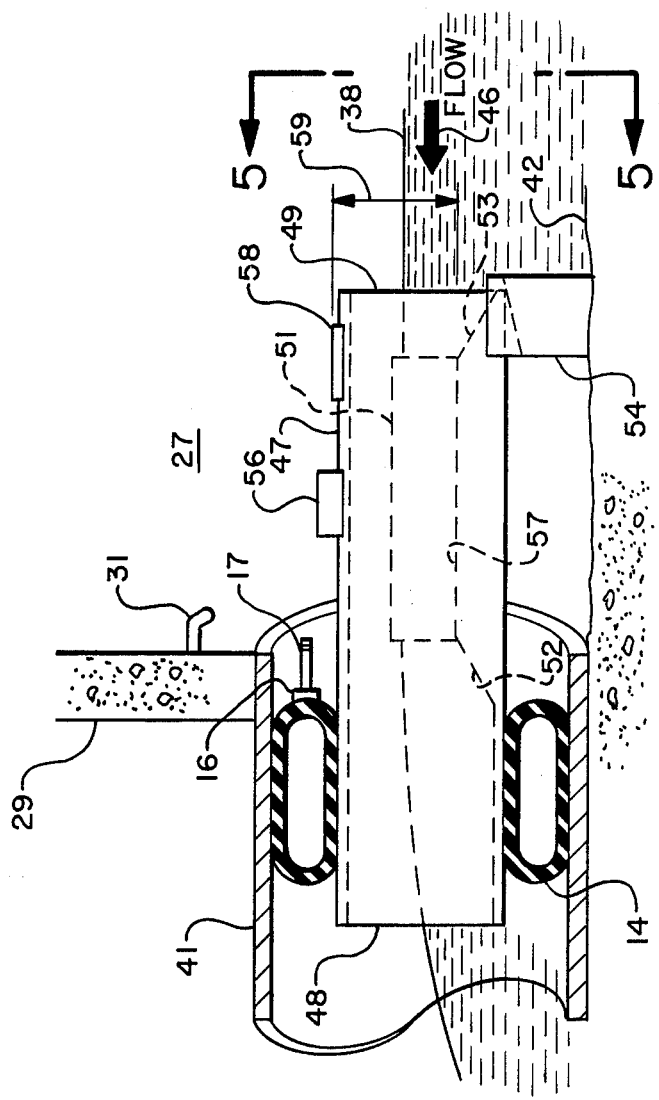
FIG. 4 is a sectional side elevation view of another embodiment of the quick insert flume.

FIG. 4 shows another embodiment of the disclosed invention for placement in the bottom of a manhole 27 having an inlet conduit 39 and an outlet conduit 41 as described before. The embodiment of FIG. 4 is similar in some respects to the embodiment of FIG. 1 and like elements are indicated by like item numbers. A cylindrical body 47 having a flow path therethrough is shown having an outlet end 48 and an inlet end 49. Previously mentioned inflatable collar 14 surrounds outlet end 48 for providing a seal between the inside surface of exit conduit 41 and the outside surface of outlet end 48. A metering flume 51 is shown in dashed lines mounted internally in inlet end 49, sealed to the inside surfaces of inlet end 49 at the ends 52 and 53 thereof. A support block 54 is positioned under the inlet end 49 for adjusting the height thereof. A level indicator 56 is mounted atop cylindrical body 47 for indicating the orientation of a bottom surface 57 in metering flume 51. A means 58 for providing a reference level relative to bottom surface 57 is mounted on top of cylindrical body 47 a predetermined height above bottom surface 57, is indicated by dimension 59. A fluid flow takes the direction indicated by arrow 46 and has a fluid flow surface 38 which is accessible ahead of metering flume 51.

As seen in FIG. 5, bottom surface 57 is oriented in a horizontal plane by a combination of rotational and vertical movement of inlet end 49 including raising and lowering thereof by vertical adjustment at support block 54. The embodiment of FIGS. 4 and 5 is installed in the bottom of a manhole 27 as described above for the embodiment of FIGS. 1, 2, and 3, including inserting exit conduit 41, sealing, leveling, holding in place and obtaining invert level while flow is passing through the bottom of manhole 27 from inlet conduit 39 to exit conduit 41.

A quick insert metering flume has been disclosed for installation in the bottom of a sewer well or manhole involving a minimum number of installation personnel and being accomplished in a minimum period of time. No blocking of the flow therethrough is required, and a minimum head drop occurs while providing an accessible free flow surface for level detection.

What is claimed is:

1. An arrangement for metering fluid flow comprising an apparatus providing a flow channel for installation in a sewer well having an inlet pipe and an exit pipe located near the bottom of the sewer well, a level measuring device for detecting the level of a fluid flowing between the inlet and exit pipes, said device being mechanically unconnected with said apparatus, said apparatus including a cylindrical exit section for placement in the exit pipe, an inlet section attached to said cylindrical exit section, a metering flume mounted in said inlet section for providing a predetermined flow cross section including a bottom surface in said inlet surface, an inflatable collar surrounding said cylindrical exit section, so that when said exit section is placed in the exit pipe and said inflatable collar is inflated, a seal is provided between the exit pipe and said cylindrical exit section, whereby all fluid flowing through said sewer well passes through said predetermined flow cross section, said apparatus further including means attached to said inlet section for providing a reference level, said reference level being located a predetermined height above said bottom surface and cooperating with said level measuring device whereby an inlet level for the flow channel may be determined while fluid is passing therethrough.

2. An arrangement as in claim 1 together with a level indicator attached to said inlet section for indicating the orientation of said flume providing a predetermined flow cross section relative to a horizontal plane.

3. A quick insert flume for installation in the exit conduit in the bottom of manhole comprising a hollow body having a flow path therethrough with an exit end and an inlet end, said exit end being a closed section formed to enter the exit conduit, an inflatable collar surrounding said exit end, a metering flume mounted internally in said inlet end, said metering flume having a bottom surface, so that when said exit end is placed in the exit conduit and inflated, a seal is formed therebetween, all fluid flowing through the bottom of the manhole is passed through said metering flume, means mounted on said hollow body positioned a predetermined height above said bottom surface of said metering flume to provide a reference level, and a device for measuring fluid surface level relative to said bottom surface provided ahead of said metering flume which is indicative of the flow rate therethrough, said device being mechanically unconnected with said metering flume and cooperating with said reference level providing means, whereby the invert level of said flow path is measured with fluid passing therethrough and without said reference level means contacting the fluid.

* * * * *